United States Patent [19]

DeBalko

[11] Patent Number: 5,524,043
[45] Date of Patent: Jun. 4, 1996

[54] REMOTELY CONNECTABLE MAINTENANCE TERMINATION UNIT

[75] Inventor: George A. DeBalko, Washington Township, Morris County, N.J.

[73] Assignee: AT&T Corp., Murray Hill, N.J.

[21] Appl. No.: 363,801

[22] Filed: Dec. 27, 1994

[51] Int. Cl.$^6$ .............................. H04N 1/24; H04N 3/08; H04N 3/22
[52] U.S. Cl. ........................... 379/2; 375/29; 375/30
[58] Field of Search .............................. 379/1, 2, 30, 27, 379/29, 32, 5, 152, 377, 412, 8

[56] References Cited

U.S. PATENT DOCUMENTS

| | | |
|---|---|---|
| 4,462,058 | 7/1984 | Ziegler ................................. 379/2 X |
| 4,626,632 | 12/1986 | Mazz ..................................... 379/29 |
| 4,653,084 | 3/1987 | Ahuja ................................... 379/29 |
| 4,807,277 | 2/1989 | Perry ................................. 379/29 X |
| 4,852,145 | 7/1989 | Bevers et al. .................... 379/29 X |
| 5,392,327 | 2/1995 | Galpin ..................................... 379/2 |

*Primary Examiner*—Stephen Chin
*Assistant Examiner*—Paul Loomis
*Attorney, Agent, or Firm*—Lester H. Birnbaum

[57] ABSTRACT

Disclosed is a circuit which permits a customer to be disconnected from a telecommunications network for testing purposes. The circuit includes a pair of switching means coupled to the tip and ring conductors of the network, and a pair of relay contacts coupled in parallel with respective switching means. The relay contacts are operated by a relay coil also coupled to the tip and ring conductors so that the switching means can be bypassed as the result of a remote signal from the network.

5 Claims, 1 Drawing Sheet

REMOTELY CONNECTABLE MAINTENANCE TERMINATION UNIT

BACKGROUND OF THE INVENTION

1. Field of the Invention

This invention relates to maintenance termination units for telecommunications systems.

2. Description of Prior Art

In modern telecommunications systems, a line of demarcation exists between the telecommunications network owned and maintained by the provider and the customer premises equipment owned and maintained by the customer. A maintenance termination unit (MTU) is a circuit commonly used to determine whether any defects reside in the network or in the customer equipment. Basically, the unit comprises bidirectional switches which are activated by a predetermined voltage and current level on the lines in order to disconnect the customer equipment from the network. If the fault persists after the customer has been disconnected, the problem lies in the network. (See, for example, U.S. Pat. No. 4,396,809 issued to Brunssen, and U.S. Pat. No. 4,529,847 issued to DeBalko.) In some earlier types of MTUs, a relay was used to connect a relaxation oscillator across the lines for testing. (See U.S. Pat. No. 4,054,759 issued to McGrath et al.)

In some instances, for example when a customer installs equipment which does not meet standards for the network, the presence of the MTU can cause the equipment to malfunction. Also, in some systems, such as Integrated Services Digital Network (ISDN), the MTU may not be compatible with the standard signaling on the lines. In such cases, it is desirable to be able to disconnect the MTU from a remote location and reconnect it when it is desired to test the system.

SUMMARY OF THE INVENTION

The invention is a circuit for disconnecting a customer from a telecommunications network. The circuit includes first and second conductors adapted for electrically coupling in series with tip and ring conductors of a telecommunications network, and first and second switching means electrically coupled in series with a respective one of the first and second conductors. A coil is electrically coupled between the first and second conductors. Also provided are first and second relay contacts coupled in parallel with a respective one of the first and second switching means, the relay contacts being responsive to a predetermined voltage across the coil so that the first and second switching means are disconnected from the tip and ring conductors when the predetermined voltage of a first polarity is applied to the coil and are reconnected to the tip and ring conductors when the predetermined voltage of an opposite polarity is applied to the coil.

BRIEF DESCRIPTION OF THE DRAWING

These and other features of the invention are delineated in detail in the description to follow. In the drawing:

The Figure is a schematic diagram of a circuit in accordance with an embodiment of the invention.

DETAILED DESCRIPTION

Figure 1:
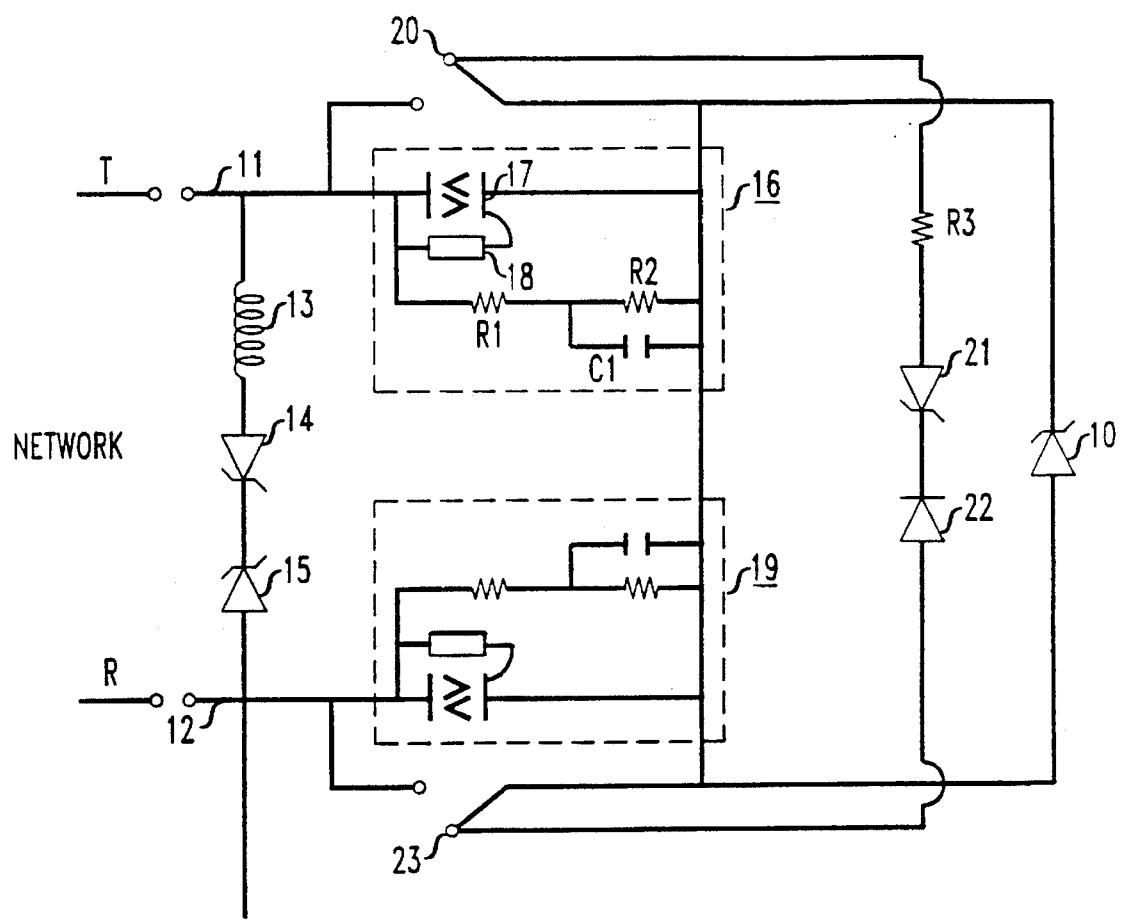

The Figure illustrates the tip (T) and ring (R) lines from the telecommunications network. The circuit according to the invention is adapted for coupling between these tip and ring lines and the customer premises equipment, illustrated as a telephone, 10.

Specifically, the conductors, 11 and 12, are adapted for coupling to the tip and ring conductors of the network. Coupled to the conductor 11 is one end of a relay coil, 13. The other end of the relay coil, 13, is coupled to the anode of a first zener diode, 14. The cathode of the first zener diode is coupled to the cathode of a second zener diode, 15. The anode of the second zener diode is coupled to the conductor 12.

Also coupled in series with the conductor 11 is a bilateral switch, 16. In this example, the switch includes a triac, 17, which is electrically coupled in parallel with a bidirectional diac, 18. The switch further includes a pair of resistors, R1 and R2, coupled in parallel with the triac and diac, and a capacitor, C1, coupled in parallel with one of the resistors, R2. An identical switch, 19, is coupled in series with the conductor 12.

Also coupled to the conductor 11 and in parallel with the switch 16 is a relay contact, 20, which is operated by the coil, 13. The relay contact, which is coupled to the phone, 10, has one terminal coupled to the conductor 11 and another terminal coupled to one end of d resistor, R3. The other end of the resistor, R3, is coupled to the anode of a zener diode, 21. The cathode of the zener diode is coupled to the cathode of another diode, 22. The anode of the diode 22 is coupled to one of the terminals of a second relay contact, 23, which is also operated by the coil 13. The second relay contact, 23, is also coupled to the phone, 10, and has another terminal coupled to conductor 12.

With the relay contacts, 20 and 23, in the positions shown, the circuit operates in much the same way as a standard MTU such as shown, for example, in U.S. Pat. No. 4,396,809 issued to Brunssen and U.S. Pat. No. 4,529,847 issued to DeBalko, which are incorporated by reference herein. Thus, the switching means, 16 and 19, are normally open. When a sufficient voltage is supplied to conductors 11 and 12, as for example, by the customer going off hook, the switching means, 16 and 19, will close to provide service to the customer. In particular, when the threshold voltage (e.g., 34 volts for the combined switches 16 and 19) is reached, the diac, 18, conducts, thereby gating the triac, 17, into a conductive condition. This results in a low impedance path between the conductors, 11 and 12, and the customer equipment, 10, so that normal telecommunications can be carried on. During normal telecommunications, the resistor, R3, and diodes, 21 and 22, present a high impedance due to the oppositely disposed diodes so that these elements are invisible to the customer.

When it is desired to test for the presence of the MTU, a voltage from the central office (e.g., 60–100 volts) is applied to conductors 11 and 12 which is sufficient not only to close the switching means, 16 and 19, but also to breakdown the zener diode, 21, to provide current flow through the diodes and the resistor, R3. The central office can thereby recognize the presence of this distinctive termination.

When it is desired to test for a fault, the central office applies a high dc voltage (e.g., 60–100 volts) to the conductors, 11 and 12, so that switching means, 16 and 19, are closed. If there is a fault anywhere between the central office and the customer equipment, it will be detected by the central office. A lower voltage (e.g., less than 12 volts) which is insufficient to close switching means, 16 and 19, is then applied to disconnect the customer equipment, 10. If the fault persists, it is now known that the fault is in the network.

The voltages applied to conductors 11 or 12 for providing telecommunications services or for testing the line will all be blocked by either zener diodes 14 or 15 depending on the polarity of the applied voltage. If, for some reason, it is desired to disconnect the MTU portion of the circuit, an even higher voltage (e.g., 150–300 volts), is applied to the conductors 11 and 12 which voltage is sufficient to breakdown the zener diodes, 14 or 15. This causes current to flow in the relay coil, 13, which, in turn, closes the relay contacts, 20 and 23. At this stage, the customer equipment, 10, is directly connected to the conductors, 11 and 12, and the MTU portion is invisible to the customer. Thus, any problems which might have been caused by the presence of an MTU have been removed remotely from the Central Office.

The relay contacts, 20 and 23, will remain closed until a voltage sufficient to breakdown the zener diodes is again applied but with an opposite polarity. Thus, for example, if it is desired to use the MTU for testing, a high voltage (e.g., 150–300 volts) could again be applied to conductors 11 and 12 to open the relay contacts, 20 and 23, followed by the normal testing procedure. Once testing was completed, the high voltage of the first polarity could be applied again to disconnect the MTU portion during normal operations.

I claim:

1. A circuit for disconnecting a customer from a telecommunications network comprising:

first and second conductors adapted for electrical connection in series with tip and ring conductors of a telecommunications network;

first and second switching means each electrically coupled in series with a respective one of the first and second conductors;

a coil electrically coupled between the first and second conductors; and first and second relay contacts each electrically coupled in parallel with a respective one of the first and second switching means, the relay contacts being responsive to a predetermined voltage across the coil so that the first and second switching means are disconnected from the tip and ring conductors when the predetermined voltage of a first polarity is applied to the coil and are reconnected to the tip and ring conductors when the predetermined voltage of an opposite polarity is applied.

2. The circuit according to claim 1 further comprising a pair of oppositely poled diodes coupled in series with the coil.

3. The circuit according to claim 1 wherein the switching means comprises a triac and a diac electrically coupled to a gate of the triac.

4. The circuit according to claim 2 wherein the diodes are zener diodes.

5. The circuit according to claim 2 wherein each relay contact has a terminal coupled in series with a termination comprising a resistor and a further pair of diodes.

* * * * *